UNITED STATES PATENT OFFICE.

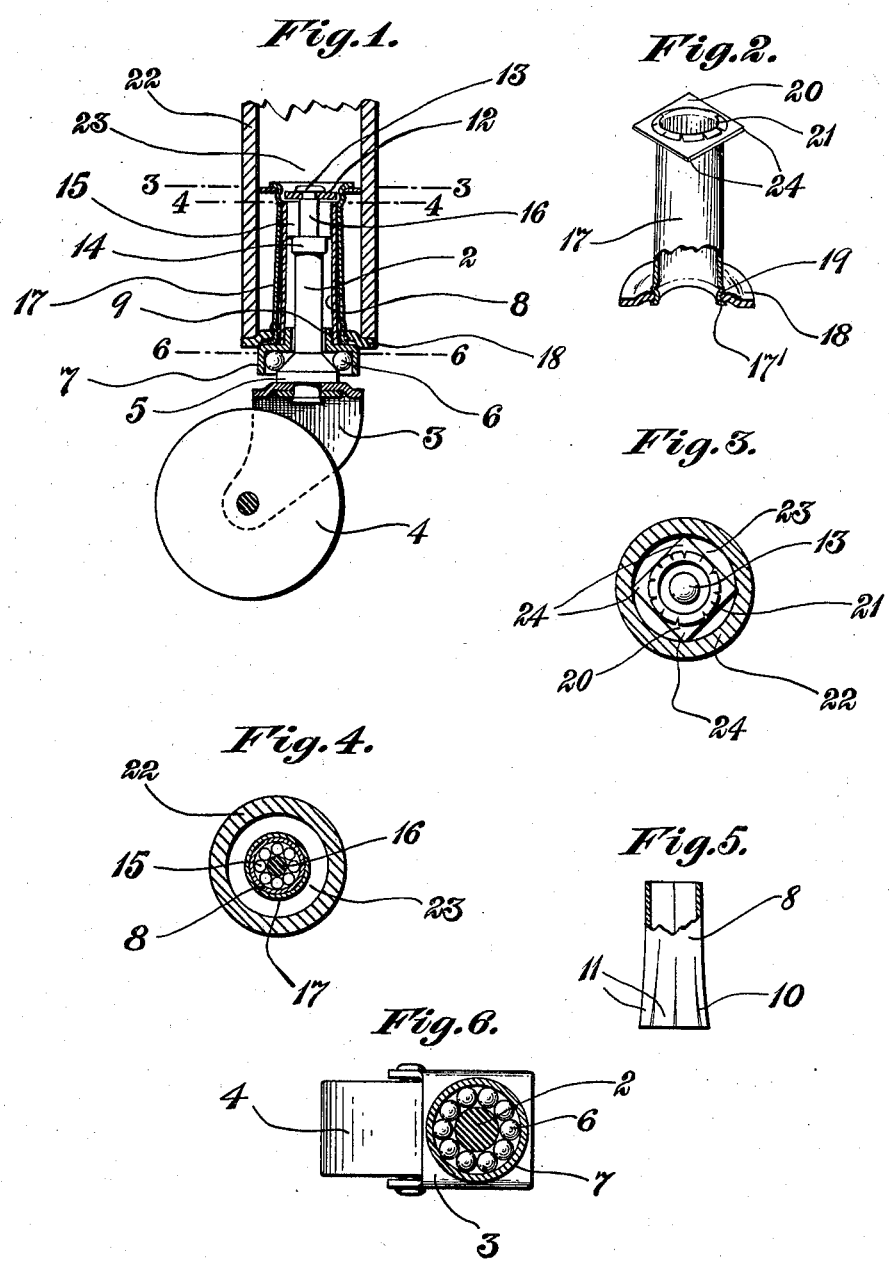

WILLIAM J. McINTYRE, OF HARTFORD, CONNECTICUT.

CASTER.

1,029,705.　　　Specification of Letters Patent.　　Patented June 18, 1912.

Application filed June 30, 1911. Serial No. 636,202.

*To all whom it may concern:*

Be it known that I, WILLIAM J. McINTYRE, a subject of the king of Great Britain, residing at Hartford, in the county of Hartford and State of Connecticut, have invented certain new and useful Improvements in Casters, of which the following is a specification.

This invention relates to casters, the object being to provide a simple device of this character which is smooth and easy running and wherein the parts can be readily assembled or separated and properly held together in action.

In the drawings accompanying and forming part of the present specification I have shown in detail one convenient form of embodiment of the invention which to enable those skilled in the art to practise the same will be set forth fully in the following description, while the novelty of the invention will be included in the claims succeeding said description. From this observation it will be clear that I do not restrict myself to such showing; I may depart therefrom in several respects within the scope of my invention covered in said claims.

Referring to said drawings: Figure 1 is a sectional view of a caster involving my invention. Fig. 2 is a perspective view of a sleeve and certain coöperative parts in perspective and with the lower part thereof partially broken away. Figs. 3 and 4 are cross sections on the lines 3—3 and 4—4 respectively of Fig. 2. Fig. 5 is an elevation with the upper portion broken away of a sleeve. Fig. 6 is a cross section on the line 6—6 of Fig. 1.

Like characters refer to like parts throughout the several figures of the drawings.

The device includes in its make-up a pintle as 2 swiveled to a yoke or bifurcated bracket as 3 between the branches of which the wheel 4 is rotatively mounted. These parts except as hereinafter pointed out may be and preferably are of the usual construction and operate after the fashion common in casters of the ordinary kind. As a matter of fact the only difference between these three parts and the caster now in common use is in the pintle 2, and I will hereinafter refer to these differences.

The pintle 2 is shown provided with an enlargement 5 which is preferably made rigid with said pintle; as a matter of simplicity the two parts may be made integral. This enlargement 5 constitutes in the present instance part of a ball-bearing comprising also several balls as 6 bearing upon the taper or approximately conical upper portion of said enlargement and surrounded by the shell or thimble 7 presenting a convenient type of ball-retainer or part of the ball bearing to which allusion has been made. This thimble or ball retainer is fixed with respect to the pintle 2 and its enlargement 5. Said balls 6 as will be seen engage the thimble 7 at two points and the conical portion of the enlargement 5 thereby providing a three-point bearing which insures revolution of the balls under all conditions and thereby ease in motion.

Surrounding the pintle 2 is a tube 8, the lower portion of which, as will hereinafter appear, yieldingly embraces the upstanding flange 9 of the thimble 7. The said tube 8 might, of course, be made of drawn tubing but after the custom usual in casters it is preferably made from a sheet formed up to present a tube. The tube 8 is slit upward from its lower edge as at 10 to produce several resilient fingers 11. There may, of course, be any desired number of these resilient portions or fingers 11. Normally or by inherency the said fingers diverge downwardly, but when they are pressed inward by the introduction of the tube 8 into a suitable socket or its equivalent, said fingers closely hug the flange 9 so as to effectually prevent rotation of the thimble 7 of which said flange forms a part. Fitted to the upper portion of the pintle 2 is a cap or crown piece 12 which may for convenience be held in place by heading or riveting as at 13, the top of said pintle, and the marginal portion of this cap or crown piece overlies the upper edge of the split tube 8 so as to prevent upward displacement of said tube, downward movement thereof being prevented by the thimble 7.

The pintle 2 is shown having above the enlargement 5 the collar 14, and between said collar and the cap 12 several rollers 15 are disposed, the butts of said rollers resting or having a bearing upon the flange or collar 14, the periphery of which it will be observed, is out of contact with the inner surface of the tube 8. These rollers move about axes parallel to the axis of rotation of the pintle 2, and they turn against the upper reduced portion 16 of the pintle and also against the inner surface of the sleeve 8. There is, therefore, provided for the pintle a double anti-friction support, and this support is of such character that oscillation or wabbling of the pintle with respect to the coöperating tube 8 is prevented.

As a suitable means for receiving the tube 8, the sleeve 17 may be provided, constituting in effect a socket for said tube 8. From this it will be evident that it is not essential that the tube 8 be fitted in a sleeve such as that denoted by 17, as it may be fitted in any suitable socket. The sleeve 17 in the present instance is cylindrical. The sleeve has attached to its lower end a disk 18 having a central opening, the said disk 18 being set into an external groove 19 formed in the lower part of the said sleeve 17 by spinning or otherwise. The lower part of the tube 17 has a flange 17' bent over the disk 18 to secure the latter in place. Surrounding the upper part of the outer or bearing sleeve 17 is a plate 20 which may be fitted in and rest on the bottom wall of a groove in said sleeve 17 said wall constituting a suitable shoulder for supporting said plate which may be positively held against upward displacement by lugs 21 integral with the sleeve 17 bent down therefrom and extending over the upper surface of said plate 20 said wall or shoulder and said lugs constituting a suitable means for positively clamping said plate in place. Said plate 20 is preferably resilient, and it provides a means for positively locking and holding the caster of which said sleeve forms a part rigidly in place in the socket of the leg of an article of furniture or something of a similar nature. It will be supposed that 22 denotes such a leg and that it has a socket 23. The diameter of the socket is greater than that of the sleeve 17. When the sleeve 17 is introduced into the socket 23, the plate 20 is flexed or bent, and I might simply utilize this effect to hold said sleeve in place. I provide, however, an additional security in the way of barbs or prongs 24 on the plate 20. When the said plate 20 is bent on the thrusting home of the sleeve 17, said plate when the sleeve is released tends to resume its initial position, and as it does so the barbs of points 24 solidly engage against the wall of the socket 23, and thereby lock the sleeve 17 in place. In the present case these barbs or points are obtained by making the plate 20 rectangular in form, the four corners presenting such points or barbs.

In assembling the parts the balls 6 are placed in the thimble 7 when the latter is inverted, and the pintle is then passed through the central opening of said thimble until the balls find a lodgment against the tapered portion of the enlargement 5. The pintle 2 is then reversed and passed through the tube 8. The rollers 15 are then put into place following which the cap 12 is applied and then held by riveting as already described. It will be understood that when the tube 8 is positioned, the fingers 11 embrace but do not tightly hug the flange 9. When the parts are thus far assembled, the tube 8 will be thrust in the sleeve 17 already in position in its socket 23 and which is adapted to closely embrace the tube 8 so that the fingers 11 will tightly grip the flange 9 and hold the thimble in place. By virtue also of the resilient lower portion of the tube 8, the latter will be effectually held in the sleeve 17 against accidental removal, although it can be readily manually pulled therefrom. In addition to this said resilient portion or fingers thereof centralizes the pintle 2.

What I claim is:

1. A caster comprising a wheeled pintle, an anti-friction bearing, one of the members of which is connected with said pintle, and a tube surrounding the pintle, slit upwardly from its lower edge to produce several resilient fingers, said resilient fingers yieldingly engaging the other member of said anti-friction bearing and being also adapted to yieldingly engage the inner wall of a socket or equivalent part into which said tube is fitted.

2. A caster comprising a pintle provided with a ball bearing portion, a thimble, a series of balls between said ball bearing portion and said thimble, each ball engaging the thimble at two points and the ball bearing portion at one point, and a tube provided with a resilient portion, the thimble having an upwardly extending flange yieldingly embraced by said resilient portion and said resilient portion being also adapted to yieldingly engage the inner surface of a socket or equivalent part in which said tube is fitted.

3. A caster comprising a bearing sleeve, and a locking plate surrounding said sleeve, said plate having a plurality of corners constituting barbs for holding the said sleeve in a socket and said sleeve being provided with means for rigidly holding said plate in position.

In testimony whereof I affix my signature in presence of two witnesses.

WILLIAM J. McINTYRE.

Witnesses:
F. E. ANDERSON,
HEATH SUTHERLAND.

Copies of this patent may be obtained for five cents each, by addressing the "Commissioner of Patents, Washington, D. C."